US012128299B2

(12) United States Patent
Harrison et al.

(10) Patent No.: US 12,128,299 B2
(45) Date of Patent: Oct. 29, 2024

(54) TIMING COMPENSATION AND CORRELATION OF INPUT WITH FRAMES IN A VIDEO GAME APPLICATION

(71) Applicant: GOOGLE LLC, Mountain View, CA (US)

(72) Inventors: Laurence Harrison, Mountain View, CA (US); Douglas Sim Dietrich, Jr., Los Gatos, CA (US); Katherine Wu, Mountain View, CA (US); Richard O'Grady, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 326 days.

(21) Appl. No.: 17/435,884

(22) PCT Filed: Mar. 18, 2020

(86) PCT No.: PCT/US2020/023346
§ 371 (c)(1),
(2) Date: Sep. 2, 2021

(87) PCT Pub. No.: WO2020/191040
PCT Pub. Date: Sep. 24, 2020

(65) Prior Publication Data
US 2022/0184492 A1 Jun. 16, 2022

Related U.S. Application Data

(60) Provisional application No. 62/937,170, filed on Nov. 18, 2019, provisional application No. 62/820,247, filed on Mar. 18, 2019.

(51) Int. Cl.
*A63F 13/355* (2014.01)
*A63F 13/31* (2014.01)

(52) U.S. Cl.
CPC ............ *A63F 13/355* (2014.09); *A63F 13/31* (2014.09)

(58) Field of Classification Search
CPC .............................. A63F 13/355; A63F 13/31
See application file for complete search history.

(56) References Cited

U.S. PATENT DOCUMENTS 8,806,054 B1 * 8/2014 Overton .................. A63F 13/31
715/720
10,412,442 B1 * 9/2019 Evans ...................... A63F 13/20
(Continued)

FOREIGN PATENT DOCUMENTS

| CN | 103095655 A | 5/2013 |
|---|---|---|
| EP | 3009938 A1 | 4/2016 |
| WO | 2018/169515 A1 | 9/2018 |

OTHER PUBLICATIONS

International Preliminary Report on Patentability mailed Sep. 30, 2021 for PCT/US2020/023346, 13 pages.
(Continued)

*Primary Examiner* — Steve Rowland

(57) ABSTRACT

A server executing an application generates a frame token for a frame that is rendered for the application. One or more first metric messages are provided to the application in response to at least one first operation performed by the server on the frame. The first metric messages include the frame token and information indicating timing of the at least one first operation. The encoded information representing the frame token and the frame is transmitted from the server towards a client. One or more second metric messages are provided to the application in response to one or more second operations performed by the client on the frame. The one or more second metric messages include the frame token
(Continued)

and information indicating timing of the second operations. A state of the application is modified based on the first and second metric messages.

26 Claims, 6 Drawing Sheets

(56) References Cited

U.S. PATENT DOCUMENTS

| | | | |
|---|---|---|---|
| 10,449,461 B1* | 10/2019 | Verma | A63F 13/86 |
| 10,531,165 B1* | 1/2020 | Evans | H04N 21/435 |
| 2015/0281029 A1* | 10/2015 | Callahan | A63F 13/355 |
| | | | 709/224 |
| 2018/0107371 A1* | 4/2018 | Spas | H04N 5/9305 |
| 2020/0155946 A1* | 5/2020 | Kong | H04L 67/131 |
| 2022/0184492 A1* | 6/2022 | Harrison | G09G 5/006 |

OTHER PUBLICATIONS

International Search Report and Written Opinion mailed Jul. 21, 2020 for corresponding International Application No. PCT/US2020/023346, 17 pages.

* cited by examiner

TIMING COMPENSATION AND CORRELATION OF INPUT WITH FRAMES IN A VIDEO GAME APPLICATION

CROSS-REFERENCE TO RELATED APPLICATIONS

The present application is a U.S. National Stage under 35 U.S.C. § 371 of International Patent Application Serial No. PCT/US2020/023346, entitled "TIMING COMPENSATION AND CORRELATION OF INPUT WITH FRAMES IN A VIDEO GAME APPLICATION" and filed on 18 Mar. 2020, which claims priority to U.S. Provisional Application No. 62/820,247, entitled "DETERMINING A DURATION OF TIME BETWEEN A COMMENCEMENT OF A PRODUCTION OF A PRESENTATION OF A PORTION OF AN APPLICATION AND A RECEIPT OF AN ACKNOWLEDGEMENT OF A RECEIPT OF THE PORTION BY A CLIENT DEVICE" and filed on 18 Mar. 2019, and U.S. Provisional Application No. 62/937,170, entitled "USING AN OPAQUE TOKEN TO MODIFY AN OPERATION PEFORMED BY AN APPLICATION" and filed on 18 Nov. 2019, the entireties of which are incorporated by reference herein.

BACKGROUND

Video game applications are conventionally played using program code that is stored in the same location as the player. For example, the program code for a video game application can be stored in a hard drive of a personal computer (PC) or a gaming console that is connected to a display device such as a high definition television. The PC or gaming console generates media (such as video or audio) for presentation to one or more players on a display or using speakers or headphones. The player uses a game controller to provide input in response to the images presented on the display or the audio signals played by the PC or gaming console. Although there are advantages to storing the video game application program code locally, there are also several disadvantages including requiring the player to maintain a large hard drive to store the program code. Delivery of the program code is also inconvenient because it requires either purchasing a disk that stores the program code or downloading the program code from a distributor, which can take up to several hours for large games. These problems are all exacerbated if the player owns numerous games.

SUMMARY OF EMBODIMENTS

In some embodiments, a method is provided for generating, at a processor in a server that implements an application, a frame token for a frame that is rendered for the application. The method also includes providing, to the application, at least one first metric message in response to at least one first operation performed by the server on the frame, the at least one first metric message comprising the frame token and information indicating timing of the at least one first operation. The method further includes transmitting, from the server for receipt by a client, encoded information representing the frame token and the frame and providing, to the application, at least one second metric message in response to at least one second operation performed by the client on the frame, the at least one second metric message comprising a representation of the frame token and information indicating timing of the at least one second operation. The method further includes modifying a state of the application based on the at least one first metric message and the at least one second metric message.

In some embodiments, the frame comprises at least one of a video frame and an audio frame generated by the application.

In some embodiments, generating the frame token for the frame includes generating the frame token in response to a request for the frame token provided by the application.

In some embodiments, generating the frame token includes generating the frame token comprising an identification number associated with the frame.

In some embodiments, providing the at least one first metric message in response to the at least one first operation includes providing the at least one first metric message in response to at least one of dispatching the frame for encoding, completing encoding of the frame, and transmitting the frame from the server for receipt by the client.

In some embodiments, the frame is a video frame and providing the at least one second metric message in response to the at least one second operation includes providing the at least one second metric message in response to at least one of receiving the encoded information at the client, successfully decoding the encoded information, and presenting the frame to a player via a display.

Some embodiments of the method include providing, to a video game application, at least one third metric message comprising information representing the frame token for the frame and at least one input provided by the player concurrently with presenting the frame to the player via the display.

In some embodiments, modifying the state of the application includes correlating, at the video game application, the at least one input with the frame based on the at least one third metric message.

In some embodiments, modifying the state of the application includes compensating for end-to-end latency based on the at least one first metric message and the at least one second metric message.

In some embodiments, a server is provided that includes a memory configured to store program code representing a software application. The server also includes a processor configured to generate a frame token for a frame that is rendered for the application and provide, to the application, at least one first metric message in response to at least one first operation performed by the server on the frame. The at least one first metric message includes the frame token and information indicating timing of the at least one first operation. The server also includes a network interface configured to transmit, for receipt by a client, encoded information representing the frame token and the frame. The processor is configured to provide, to the application, at least one second metric message in response to at least one second operation performed by the client on the frame, the at least one second metric message comprising the frame token and information indicating timing of the at least one second operation. The processor is also configured to modify a state of the application based on the at least one first metric message and the at least one second metric message.

In some embodiments, the frame includes at least one of a video frame and an audio frame generated by the application.

Some embodiments of the processor are configured to generate the frame token in response to a request for the frame token provided by the application.

Some embodiments of the processor are configured to generate a frame token comprising an identification number of the frame.

Some embodiments of the network interface are configured to provide the at least one first metric message in response to at least one of dispatching the frame for encoding, completing encoding of the frame, and transmitting the frame from the server for receipt by the client.

Some embodiments of the network interface are configured to provide the at least one second metric message in response to at least one of receiving the encoded information at the client, successfully decoding the encoded information, and presenting the frame to a player.

Some embodiments of the network interface are configured to provide, to the application, at least one third metric message comprising information representing the frame token for the frame and at least one input provided by the player concurrently with presenting the frame to the player via the display.

Some embodiments of the processor or configured to correlate the at least one input with the frame based on the at least one third metric message.

Some embodiments of the processor are configured to compensate for end-to-end latency based on the at least one first metric message and the at least one second metric message and modify the game state based on the end-to-end latency.

In some embodiments, a non-transitory computer readable medium embodying a set of executable instructions is provided. The set of executable instructions manipulate at least one processor to perform the method disclosed herein.

In some embodiments, a system is provided to perform the method disclosed herein.

In some embodiments, a method is provided that includes receiving, at a client from a server, encoded information representing a frame that is rendered for an application and an associated frame token and decoding, at the client, the encoded information. The method also includes, in response to decoding the encoded information, providing the frame to a display for presentation to a player. The method further includes transmitting, from the client for receipt by the server, at least one first metric message in response to the decoding and providing the frame to the display, the at least one first metric message including information representative of the frame token and information indicating timing of the decoding and providing the frame to the display.

In some embodiments, the frame comprises at least one of a video frame and an audio frame generated by the application.

In some embodiments, the frame token includes an identification number of the frame.

Some embodiments of the method include detecting at least one input provided by the player concurrently with the frame being presented to the player via the display and transmitting, to the server, at least one second metric message including information representing the frame token for the frame and the at least one input.

In some embodiments, an apparatus is provided that includes a receiver configured to receive, from a server, encoded information representing a frame that is rendered for an application and an associated frame token. The apparatus also includes a processor configured to decode the encoded information and in response to decoding the encoded information, provide the frame to a display for presentation to a player. The apparatus also includes a network interface configured to transmit, towards the server, at least one first metric message in response to the processor decoding and providing the frame to the display, the at least one first metric message including the frame token and information indicating timing of the decoding and providing the frame to the display.

In some embodiments, the frame comprises at least one of a video frame and an audio frame generated by the application.

In some embodiments, the frame token comprises an identification number of the frame.

Some embodiments of the processor are configured to detect at least one input provided by the player concurrently with the frame being presented to the player via the display.

Some embodiments of the network interface are configured to transmit, to the server, at least one second metric message comprising information representing the frame token for the frame and the at least one input.

In some embodiments, a non-transitory computer readable medium embodying a set of executable instructions is provided. The set of executable instructions manipulate at least one processor to perform the method as disclosed herein.

In some embodiments, a system is provided to perform the method as disclosed herein.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
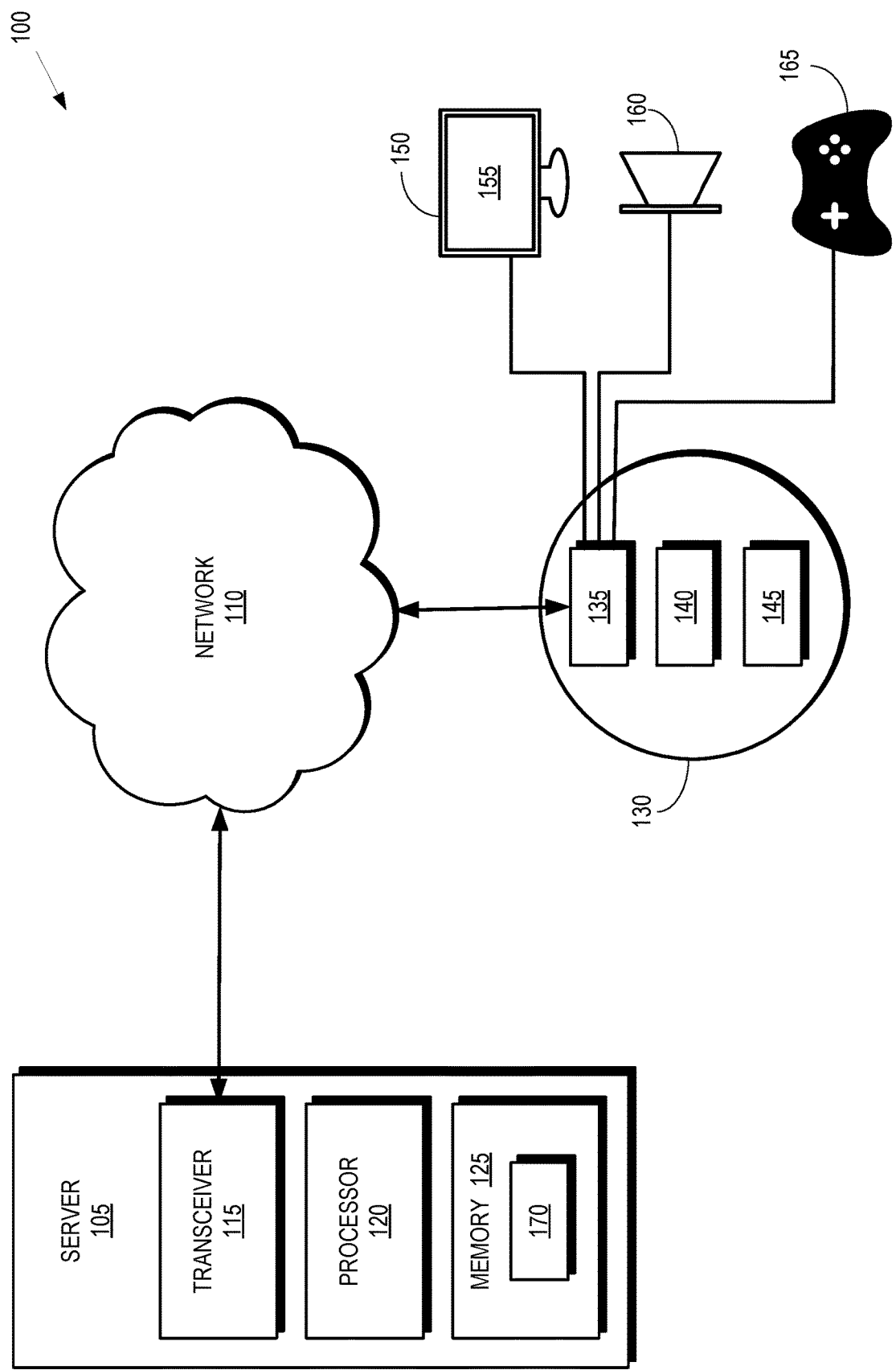
FIG. 1 is a block diagram of a cloud-based processing system that supports timing compensation and correlation of inputs with frames based on frame tokens according to some embodiments.

Streaming applications such as games from a central server, such as a cloud server, has the potential to alleviate difficulties associated with the acquisition and storage of program code and the like. Dramatic improvements in bandwidth and reductions in network latency make it possible to implement games as streaming applications provided by a server to a client in the player's location. The game server executes game code that implements a physics engine, renders graphics and audio frames, and controls other aspects of the game state, as well as performing modifications of the game state in response to input provided by the player. The server transmits encoded video and audio frames to the client, which is implemented in a local processing device. The client decodes the frames and provides the video (via a display) and the audio (via speakers or earphones) to the player. The player provides input to the client using a game controller or other devices such as visual or infrared sensors that capture and analyze the player's motions. As used herein, the term "game controller" refers to any device that allows the player to generate input to the video game application responsive to video, audio, haptic, or other sensory output generated by the client. For example, the player uses the various buttons on the game controller to cause a character in the game to perform actions in response to the video or audio frames presented to the player.

Despite ongoing improvements in network bandwidth and latency, there is still significant (and sometimes variable) end-to-end latency from the application that generates the video/audio to the display/speakers that represent the frames. The end-to-end latency can introduce difficulties correlating game events generated by the application with input provided by the player. Similar drawbacks occur in other applications that require synchronization of user response and sensory output generated by the application.

FIGS. 1-6 disclose systems and techniques for gathering real time network information associated with a video game application from the server that hosts the video game application and the client that serves video or audio frames to the player. The video game application (hereafter referred to as "application" or "software application," for ease of reference) uses the network information to compensate for end-to-end latency and to correlate input received from the player with frames that were presented to the player concurrently with the player generating the input. The server generates a frame token for a frame that is rendered for the application, such as a video frame or an audio frame. The frame token includes information (such as a frame identification number) that associates the frame token with the frame. In some embodiments, the server generates the frame token in response to a request from the application. The frame token is processed by the server and the client in conjunction with the frame. The server and the client generate timing information that indicates when the frame was processed at different points within the server. In some embodiments, the server generates information indicating a first time that the frame was dispatched for encoding, a second time when encoding of the frame was completed, and a third time when the frame was transmitted from the server towards the client. In some embodiments, the client generates a fourth time when the encoded frame was received from the server, a fifth time when the client successfully decoded the frame, and a sixth time when the client presented the frame to the player via a display. However, more or fewer times are recorded at more or fewer processing points in other embodiments.

The server and the client return metric messages including the timing information and the frame token to the application. The server returns one or more metric messages including the recorded times and the associated frame token to the application. The client returns one or more metric messages including the recorded times and the associated frame token to the server, which provides the metric messages to the application. In some embodiments, the recorded times and associated frame tokens are batched over more than one frame and the metric message includes a set of recorded times/tokens for the frames in the batch. Inputs from the player are correlated with the frame token that is associated with the video or audio frame that was presented to the player concurrently with the input received from the player. Metric messages including information representing the inputs are returned to the server with the correlated frame tokens. The application uses the metric messages to compensate for end-to-end latency. For example, the application can determine that the user provided input while viewing a video frame (or hearing an audio frame) even if there is a long, variable, or unexpected delay between the application generating the frame and subsequently receiving the input. For another example, the application can modify the size of the buffer that stores messages received from the client to increase or decrease the time available for receiving inputs from the player. Some embodiments of the application roll back the game state in response to one or more of the metric messages. For example, if the application receives an input associated with a frame token that should have been received 50 ms prior to the current game time, the application rolls back the game state by 50 ms and processes the input based on the game state at the earlier game time.

FIG. 1 is a block diagram of a cloud-based processing system 100 that supports timing compensation and correlation of inputs with frames based on frame tokens according to some embodiments. The cloud-based processing system 100 includes a server 105 that is interconnected with a network 110. Although a single server 105 shown in FIG. 1, some embodiments of the cloud-based processing system 100 include more than one server connected to the network 110. In the illustrated embodiment, the server 105 includes a transceiver 115 (or other network interface) that transmits signals towards the network 110 and receives signals from the network 110. The transceiver 115 can be implemented using one or more separate transmitters and receivers. The server 105 also includes one or more processors 120 and one or more memories 125. The processor 120 executes instructions such as program code stored in the memory 125 and the processor 120 stores information in the memory 125 such as the results of the executed instructions.

The cloud-based processing system 100 includes one or more processing devices 130 such as a computer, set-top box, gaming console, and the like that are connected to the server 105 via the network 110. In the illustrated embodiment, the processing device 130 operates as a client to the server 105. The processing device 130 includes a transceiver 135 (or other network interface) that transmits signals towards the network 110 and receives signals from the network 110. The transceiver 135 can be implemented using one or more separate transmitters and receivers. The processing device 130 also includes one or more processors 140 and one or more memories 145. The processor 140 executes instructions such as program code stored in the memory 145 and the processor 140 stores information in the memory 145 such as the results of the executed instructions. The transceiver 135 is connected to a display 150 that displays images or video on a screen 155, one or more speakers 160 that generate audio output, and a game controller 165. Some embodiments of the cloud-based system 100 are therefore used by cloud-based streaming applications including video game applications.

Program code representing an application 170 is stored in the memory 125 on the server 105. Some embodiments of the application 170 support a streaming applications such as a video game application that is played by one or more players at the processing device 130, which operates as a client for the application service. The application 170 generates frames including frames that represent images, video, audio, haptic output, or other sensory output that is generated at the processing device 130 based on the frames received from the server 105. In the illustrated embodiment, the processor 120 in the server 105 generates frame tokens for the frames that are rendered for the application 170. As discussed herein, the server 105 generates metric messages in response to operations performed on the frames by the server 105. The metric messages include the corresponding frame token and information indicating timing of the operations, such as a timestamp that records the time that the operation was performed. The server 105 also encodes the frame and the frame token and the transceiver 115 transmits the encoded information to the client processing device 130.

The processing device 130 also generates metric messages that are returned to the server 105, which provides that the received metric messages to the application 170. The metric messages are generated in response to operations performed by the processing device 130 on the frames received from the server 105. The metric messages include the frame token and information indicating timing of the operations, such as a timestamp indicating a time at which the operation was performed. Some embodiments of the processing device 130 generate additional messages in response to input provided by a player, e.g., via the controller 165. The messages that are generated in response to the input include information representing the frame token for the frame that was being presented concurrently with the input being provided by the player. The messages also include information representing the input.

A state of the application 170 or the server 105 is modified based on the metric messages generated by the server 105 or the client processing device 130. Some embodiments of the application 170 use the metric messages to compensate for end-to-end latency from generation of a frame by the application 170 to presentation of the frame by the display 150 or the speaker 160. The application 170 can also roll back the game state (e.g., the state of the transceiver 115, the processor 120, with the memory 125 in the server 105) in response to the metric messages. For example, if the application 170 receives an input associated with a frame token that should have been received 50 ms prior to the current game time, the application 170 rolls back the game state by 50 ms and processes the input based on the game state at the earlier game time. Some embodiments of the application 170 use the metric messages provided by the processing device 130 to correlate player input with the frame that was being presented (or used to generate sensory output) concurrently with the player generating the input.

Figure 2:
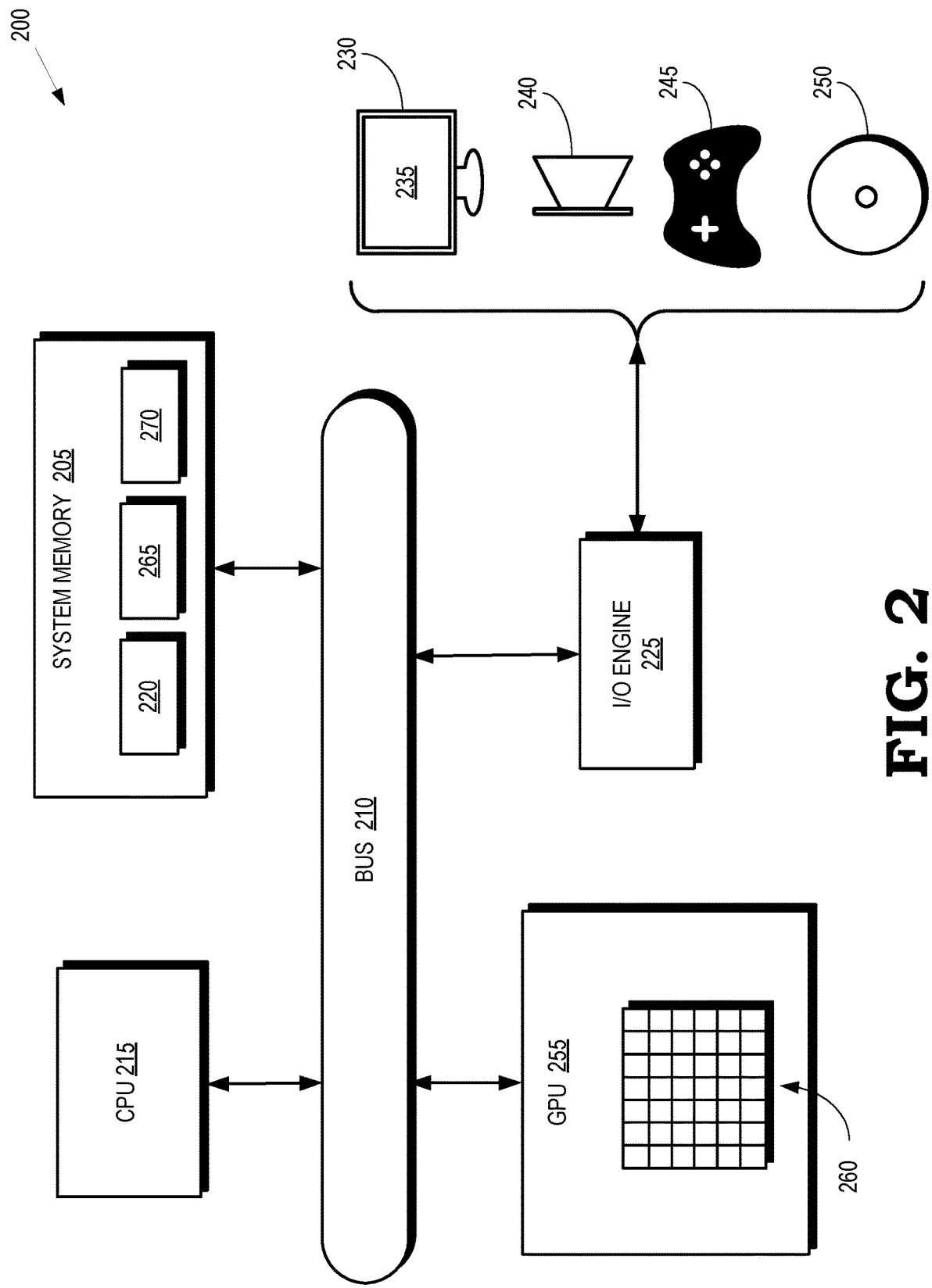
FIG. 2 is a block diagram of a processing system that supports timing compensation and correlation of inputs with frames based on frame tokens according to some embodiments.

FIG. 2 is a block diagram of a processing system 200 that supports timing compensation and correlation of inputs with frames based on frame tokens according to some embodiments. The processing system 200 includes or has access to a memory 205 or other storage component that is implemented using a non-transitory computer readable medium such as a dynamic random-access memory (DRAM). However, some embodiments of the memory 205 are implemented using other types of memory including static RAM (SRAM), nonvolatile RAM, and the like. The processing system 200 also includes a bus 210 to support communication between entities implemented in the processing system 200, such as the memory 205. Some embodiments of the processing system 200 include other buses, bridges, switches, routers, and the like, which are not shown in FIG. 2 in the interest of clarity.

The processing system 200 includes a central processing unit (CPU) 215. Some embodiments of the CPU 215 include multiple processing elements (not shown in FIG. 2 in the interest of clarity) that execute instructions concurrently or in parallel. The processing elements are referred to as processor cores, compute units, or using other terms. The CPU 215 is connected to the bus 210 and the CPU 215 communicates with the memory 205 via the bus 210 (or other network interface). The CPU 215 executes instructions such as program code 220 stored in the memory 205 and the CPU 215 stores information in the memory 205 such as the results of the executed instructions. The CPU 215 is also able to initiate graphics processing by issuing draw calls.

An input/output (I/O) engine 225 handles input or output operations associated with a display 230 that presents images or video on a screen 235. The I/O engine 225 also handles input or output operations associated with one or more speakers 240, which can also include or be associated with corresponding microphones (not shown in FIG. 2 in the interest of clarity). In the illustrated embodiment, the I/O engine 225 is connected to a game controller 245 which provides control signals to the I/O engine 225 in response to a user pressing one or more buttons on the game controller 245 or interacting with the game controller 245 in other ways, e.g., using motions that are detected by an accelerometer. The I/O engine 225 also provides signals (via the bus 210 or other network interface) to the game controller 245 to trigger responses in the game controller 245 such as vibrations, illuminating lights, and other haptic or sensory outputs. In the illustrated embodiment, the I/O engine 225 reads information stored on an external storage component 250, which is implemented using a non-transitory computer readable medium such as a compact disk (CD), a digital video disc (DVD), and the like. The I/O engine 225 also writes information to the external storage component 250, such as the results of processing by the CPU 215. Some embodiments of the I/O engine 225 are coupled to other elements of the processing system 200 such as keyboards, mice, printers, external disks, and the like. The I/O engine 225 is coupled to the bus 210 (or other network interface) so that the I/O engine 225 communicates with the memory 205, the CPU 215, or other entities that are connected to the bus 210.

The processing system 200 includes at least one graphics processing unit (GPU) 255 that renders images for presentation on the screen 235 of the display 230, e.g., by controlling pixels that make up the screen 235. For example, the GPU 255 renders visual content to produce values of pixels that are provided to the display 230, which uses the pixel values to display an image that represents the rendered visual content. The GPU 255 includes one or more processing elements such as an array 260 of compute units that execute instructions concurrently or in parallel. Some embodiments of the GPU 255 are used for general purpose computing. In the illustrated embodiment, the GPU 255 communicates with the memory 205 (and other entities that are connected to the bus 210) over the bus 210. However, some embodiments of the GPU 255 communicate with the memory 205 over a direct connection or via other buses, bridges, switches, routers, or other network interface. The GPU 255 executes instructions stored in the memory 205 and the GPU 255 stores information in the memory 205 such as the results of the executed instructions. For example, the memory 205 stores a copy 265 of instructions that represent a program code that is to be executed by the GPU 255.

As discussed herein, some embodiments of the CPU 215 or the GPU 255 generate frame tokens associated with frames that are used to generate sensory output received by a user or player of the processing system 200. Entities within the processing system 200 generate feedback in response to performing operations on the frames and provide the feedback with the corresponding frame tokens to applications executing on the CPU 215 or the GPU 255. The applications use the feedback to compensate for latency within the processing system 200, as discussed herein. In some embodiments, information 270 representing the feedback is stored in the memory 205.

Figure 3:
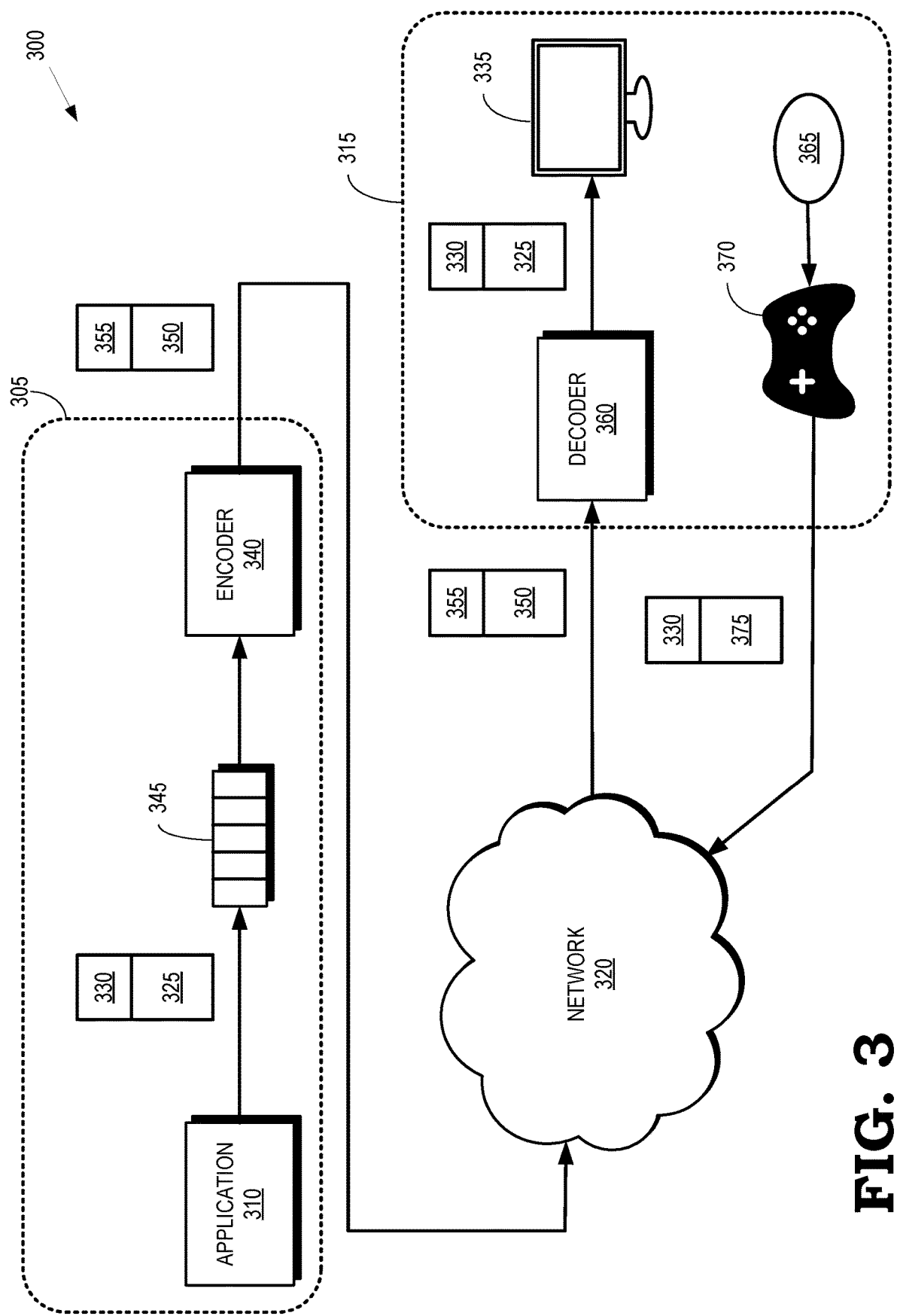
FIG. 3 is a block diagram of a processing system that includes a server that supports an application that provides streaming services, such as a video game application, to a client via a network according to some embodiments.

FIG. 3 is a block diagram of a processing system 300 that includes a server 305 that supports an application 310 that provides streaming services, such as a video game application, to a client 315 via a network 320 according to some embodiments. The processing system 300 is used to implement some embodiments of the cloud-based processing system 100 shown in FIG. 1 and the processing system 200 shown in FIG. 2. The application 310 generates frames that are provided to the client 315 to generate video, audio, haptic, or other sensory output that are provided to a user at the client, such as a player of a video game application implemented by the application 310. In the illustrated embodiment, the application 310 requests that the server 305 and the client 315 generate feedback based on frame tokens created by the server 305 and transmitted with the frames generated by the application 310. For example, in response to the application 310 generating a frame 325, the server 305 (or a processor implemented on the server 305 such as the processor 120 shown in FIG. 1) generates a frame token 330 such as an identification number that identifies the frame 325. The frame token 330 and the frame 325 are subsequently transmitted together (or in conjunction with each other) along a path from the application 310 to presentation by the client 315, e.g., on a display 335.

The frame 325 and the frame token 330 are encoded for transmission using an encoder 340 implemented by (or accessible to) the server 305. The encoder 340 is implemented using a processor such as the processor 120 shown in FIG. 1, the CPU 215 or the GPU 255 shown in FIG. 2, dedicated encoding hardware, or a combination thereof. The encoder 340 generates encoded information representative of the frame 325 and the frame token 330, which is represented as an encoded frame 350 and an encoded frame token 355. In some embodiments, the server 305 includes a buffer 345 that is used to buffer the frame 325 or the frame token 330 prior to transmission. The buffer 345 is used to buffer packets prior to encoding by the encoder 340. However, the buffer 345 (or other buffers) can buffer packets at other locations such as buffering the encoded frame 350 or the encoded frame token 355 after encoding by the encoder 340 and prior to transmission from the server 305.

The encoded frame 350 and the encoded frame token 355 are transmitted from the server 305 to the client 315 via the network 320. The client 315 includes a decoder 360 that decodes the encoded frame 350 and the encoded frame token 355. The decoder 360 is implemented using a processor such as the processor 140 shown in FIG. 1, the CPU 215 or the GPU 255 shown in FIG. 2, dedicated encoding hardware, or a combination thereof. If the decoding process is successful, the decoder 360 generates the frame 325 and the frame token 330 that were generated by the application 310. In response to successful decoding, the client 315 provides the frame 325 to the display 335 for presentation to the user or player. As discussed herein, some embodiments of the frame 325 represent other sensory output such as audio output or haptic output, in which case the client 315 uses the frame 325 to provide the corresponding sensory output to the user or player.

In some embodiments, the user or player generates an input 365 in response to the sensory output produced by the client 315 based on the frame 325. For example, if the frame 325 represents an image of a mole poking his head out of a hole in a game of "whack-a-mole," the player may provide an input 365 via a controller 370 that indicates an attempt by the player to "whack" the mole. Information representative of the input 365 is included in a metric message 375. The client 315 also associates the frame token 330 (or a representation thereof) with the metric message 375 because the frame 325 was presented to the user or player concurrently with the user or player generating the input 365. In some embodiments, the representation of the frame token 330 includes a subset of the information that represents the frame token 330 that is sufficient to associate the frame token 330 with the metric message 375 at the application 310. The frame token 330 (or the representation thereof) and the metric message 375 are then returned to the server 305, which provides the frame token 330 and the metric message 375 to the application 310. In the interest of clarity, arrows indicating the path of the frame token 330 and the metric message 375 from the network 320 to the application 310 are not shown in FIG. 3.

The application 310 uses the received frame token 330 (or the representation thereof) and the metric message 370 to correlate the input 365 with the frame 325 that was presented to the user or player concurrently with the input 365. Thus, despite delays or latency between transmission of the frame 325 from the application 310 and presentation of the frame 325 via the display 335, the application 310 is able to determine that the user or player generated the input 365 while viewing (or sensing) the sensory output generated based on the frame 325. For example, if the frame 325 represents an image of a mole poking his head out of a hole in a game of "whack-a-mole," the application 310 can determine that the player successfully provided the input 365 via the controller 370 to "whack" the mole while the mole was visible to the player. As discussed herein, other entities in the processing system 300 also provide metric messages that are associated with corresponding frame tokens and the application 310 uses these metric messages to modify the state of the application 310 or the server 305. For example, the application 310 or the server 305 can modify a size of the buffer 345 based on the received metric messages. The size of the buffer 345 is increased in response to the received metric messages indicating an increase in an end-to-end latency and the size of the buffer 345 is decreased in response to the received metric messages indicating a decrease in the end-to-end latency.

Figure 4:
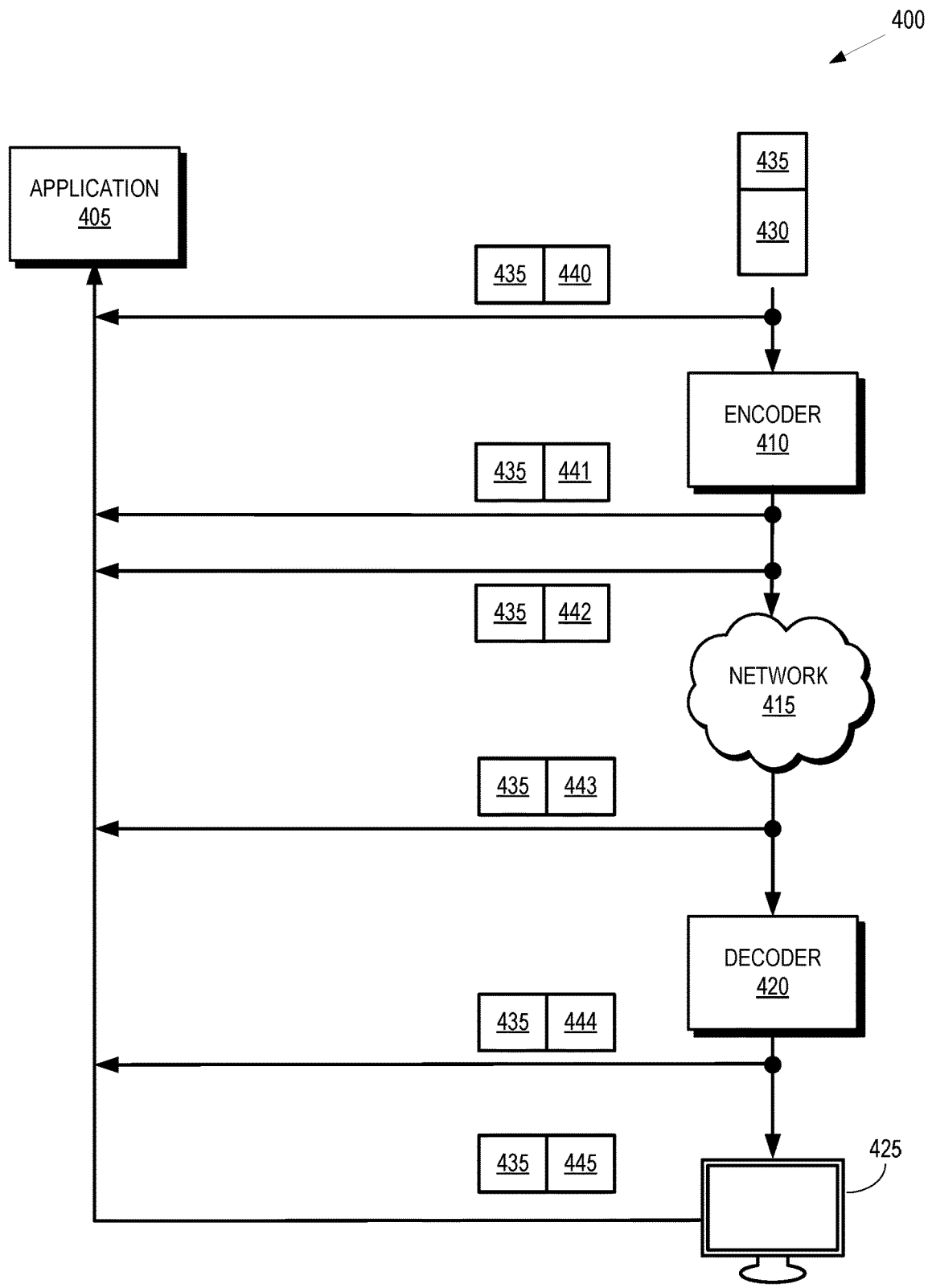
FIG. 4 is a block diagram of a processing system including entities that tag metric messages with corresponding frame tokens according to some embodiments.

FIG. 4 is a block diagram of a processing system 400 including entities that tag metric messages with corresponding frame tokens according to some embodiments. The processing system 400 is used to implement some embodiments of the cloud-based processing system 100 shown in FIG. 1, the processing system 200 shown in FIG. 2, and the processing system 300 shown in FIG. 3. The processing system 400 includes an application 405 that generates one or more frames for providing a sensory output to a user or player. The processing system 400 also includes an encoder 410 to encode the frames for transmission via a network 415, the decoder 420 to decode the frames received via the network 415, and a display 425 that is used to present images to the user or player based on the received frames. As discussed herein, other devices are used to present other sensory output based on the frames in some embodiments.

A frame 430 is generated by the application 410 and associated with a frame token 435. The frame 430 and the corresponding frame token 435 are then processed by the other entities that convey the frame 430 to the display 425. These entities (or a corresponding server or client that hosts the entities) generate metric messages that are fed back to the application 410. The metric messages are associated with the frame token 435 to allow the application 410 to compensate for end-to-end delays or correlate the frame 430 with actions or inputs performed by users or players. The metric messages also include timing information for operations performed on the frame 430, such as a timestamp indicating a time that an operation was performed.

In the illustrated embodiment, a metric message 440 and the frame token 435 are transmitted to the application 410 in response to dispatching the frame 430 (or a representation thereof) towards the encoder. A metric message 441 and the frame token 430 (or the representation thereof) are transmitted to the application 410 in response to the encoder 415 encoding the frame 430 and the frame token 435. A metric message 442 and the frame token 435 (or a representation thereof) are transmitted to the application 410 in response to the encoded frame 430 and frame token 435 being transmitted from the server into the network 420. A metric message 443 and the frame token 435 (or a representation thereof) are transmitted to the application 410 in response to the encoded frame 430 and frame token 435 being received at the client from the network 420. A metric message 444 and the frame token 435 (or a representation thereof) are transmitted to the application 410 in response to the encoded frame 430 and frame token 435 being successfully decoded by the decoder 425. A metric message 445 and the frame token 435 (or a representation thereof) are transmitted to the application 410 in response to the frame 430 and frame token 435 being provided to the display 425 for presentation to the player or user.

Figure 5:
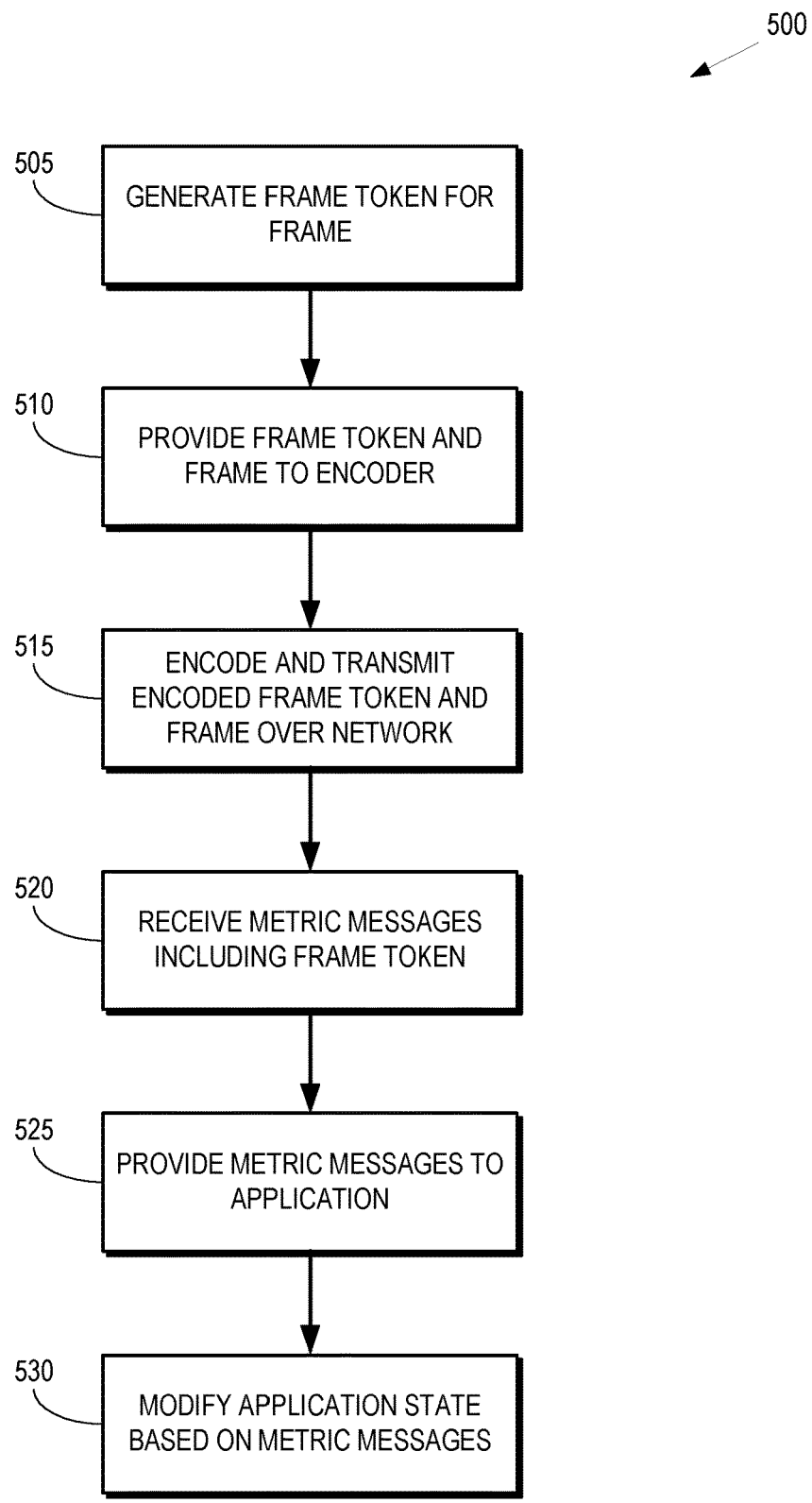
FIG. 5 is a flow diagram of a method of modifying an application state based on metric messages and associated frame tokens according to some embodiments.

FIG. 5 is a flow diagram of a method 500 of modifying an application state based on metric messages and associated frame tokens according to some embodiments. The method 500 is implemented in some embodiments of the cloud-based processing system 100 shown in FIG. 1, the processing system 200 shown in FIG. 2, and the processing system 300 shown in FIG. 3. Some embodiments of the method 500 are implemented in a server such as the server 105 shown in FIG. 1 and the server 305 shown in FIG. 3.

At block 505, the server generates a frame token for a frame produced by an application. In some embodiments, the frame token is generated by the server in response to receiving a request to create frame tokens from the application. At block 510, the frame and the associated frame token are provided to an encoder implemented in the server. At block 515, the encoder encodes the frame and the associated frame token. The server then transmits the encoded information via a network. As discussed herein, metric messages associated with the operations performed in blocks 510 and 515 are generated and transmitted back to the application with the associated frame token.

At block 520, the server receives one or more additional metric messages in response to providing the encoded information, e.g., to a client. The additional metric messages include or are associated with the frame token included in the encoded information. At block 525, the server provides the metric messages and the frame token to the application. At block 530, the application modifies the application state (or the state of the server) based on the information included in the metric messages and the frame token. As discussed herein, some embodiments of the application compensate for end-to-end latency, roll back the application state, correlate user/player inputs with the frame, and the like based on the information in the metric messages and the frame token.

Figure 6:
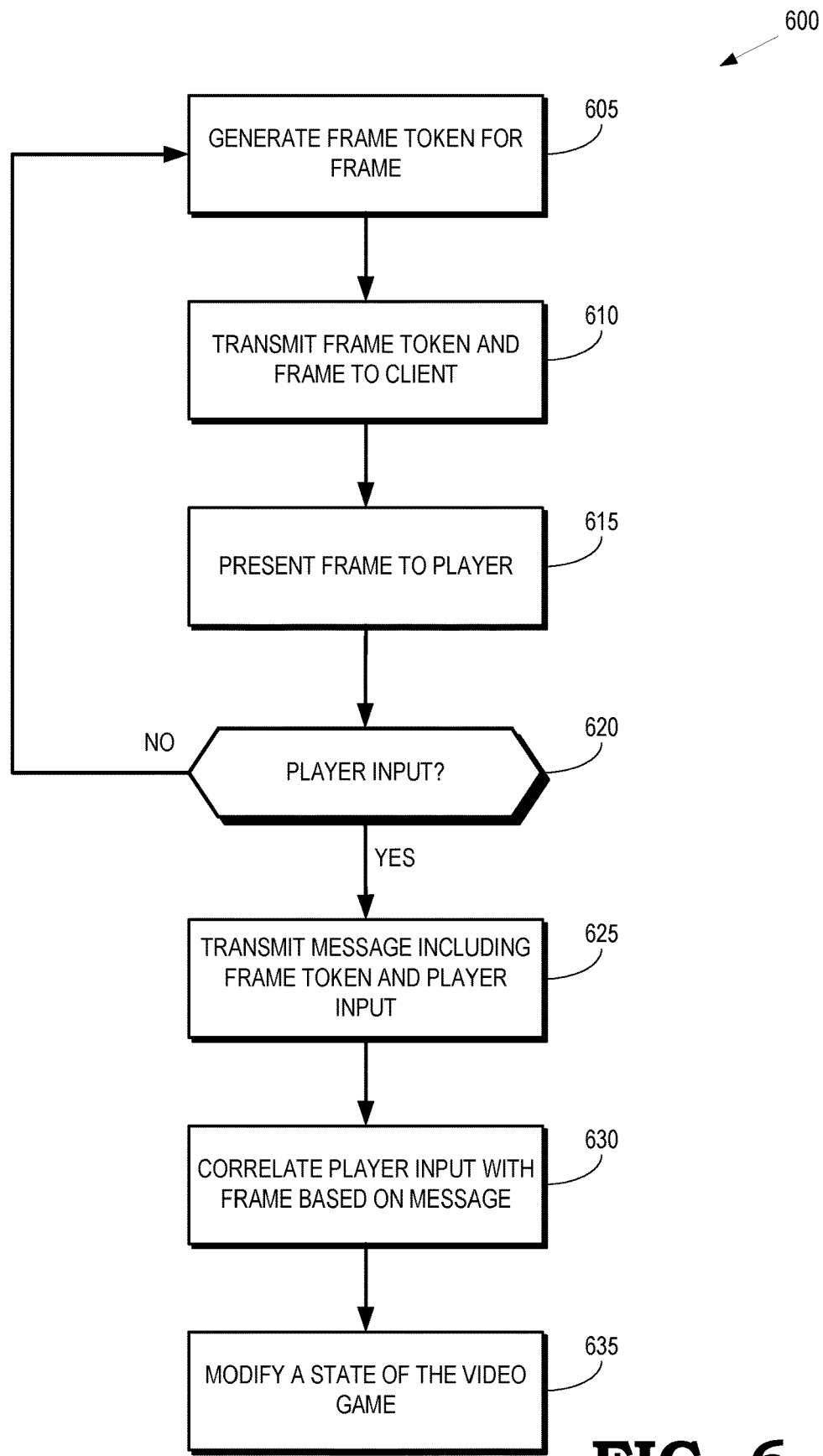
FIG. 6 is a flow diagram of a method of correlating timing of a transmitted frame with timing of user input according to some embodiments.

FIG. 6 is a flow diagram of a method 600 of correlating timing of a transmitted frame with timing of user input according to some embodiments. The method 600 is implemented in some embodiments of the cloud-based processing system 100 shown in FIG. 1, the processing system 200 shown in FIG. 2, and the processing system 300 shown in FIG. 3.

At block 605, a server generates a frame token for a frame produced by an application. At block 610, the frame and the associated frame token are transmitted from the server to a client via a network. Some embodiments of the server encode the frame and the associated frame token prior to transmitting the encoded information to the client. At block 615, the client presents sensory output based on the received frame to a user or player. As discussed herein, the sensory output can include video, audio, haptic output, and the like.

At decision block 620, the client determines whether any player input has been received concurrently with presentation of the sensory output based on the frame. If not, the method 600 flows back to block 605 and another frame and corresponding frame token are generated. If the client detects player input concurrent with presentation of the sensory output, the method 600 flows to block 625.

At block 625, the client generates a metric message including information representing the player input. The metric message is then transmitted back to the server with the frame token for the frame that was presented concurrently with receiving the player input.

At block 630, the server receives the metric message and the frame token. The server provides the metric message and the frame token to the application, which uses the received information to correlate the metric message with the frame associated with the frame token, as discussed herein.

At block 635, a state of the application is modified based on the received information. For example, if the received information indicates that a player of a video game application performed a required action by providing an input concurrently with display of the frame associated with the frame token, the state of the video game application is modified to indicate successful completion of the action. If the received information indicates that the player of the video game application did not perform the required action, e.g., by failing to provide the input concurrently with display of the frame associated with the frame token, the state of the video game application is modified to indicate that the action was not successfully completed.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    generating, at a processor in a server that implements an application, a frame token for a frame that is rendered for the application;
    providing, to the application, at least one first metric message in response to at least one first operation performed by the server on the frame, the at least one first metric message comprising the frame token and information indicating timing of the at least one first operation;
    transmitting, from the server for receipt by a client, encoded information representing the frame token and the frame;
    providing, to the application, at least one second metric message in response to at least one second operation performed by the client on the frame, the at least one second metric message comprising a representation of the frame token and information indicating timing of the at least one second operation;
    modifying a state of the application based on the at least one first metric message and the at least one second metric message; and
    rolling back the state of the application in response to at least one input associated with the frame token.

2. The method of claim 1, wherein the frame comprises at least one of a video frame and an audio frame generated by the application.

3. The method of claim 1, wherein generating the frame token for the frame comprises generating the frame token in response to a request for the frame token provided by the application.

4. The method of claim 1, wherein generating the frame token comprises generating the frame token comprising an identification number associated with the frame.

5. The method of claim 1, wherein providing the at least one first metric message in response to the at least one first operation comprises providing the at least one first metric message in response to at least one of dispatching the frame for encoding, completing encoding of the frame, and transmitting the frame from the server for receipt by the client.

6. The method of claim 1, wherein:
    the frame is a video frame; and
    providing the at least one second metric message in response to the at least one second operation comprises providing the at least one second metric message in response to at least one of receiving the encoded information at the client, successfully decoding the encoded information, and presenting the frame to a player via a display.

7. The method of claim 6, further comprising:
    providing, to a video game application, at least one third metric message comprising information representing the frame token for the frame and at least one input provided by the player concurrently with presenting the frame to the player via the display.

8. The method of claim 7, wherein modifying the state of the application comprises correlating, at the video game application, the at least one input with the frame based on the at least one third metric message.

9. The method of claim 1, wherein modifying the state of the application comprises compensating for end-to-end latency based on the at least one first metric message and the at least one second metric message.

10. A server comprising:
    a memory configured to store program code representing a software application;
    a processor configured to generate a frame token for a frame that is rendered for the software application and provide, to the software application, at least one first metric message in response to at least one first operation performed by the server on the frame, the at least one first metric message comprising the frame token and information indicating timing of the at least one first operation; and
    a network interface configured to transmit, for receipt by a client, encoded information representing the frame token and the frame,
    wherein the processor is configured to provide, to the software application, at least one second metric message in response to at least one second operation performed by the client on the frame, the at least one second metric message comprising the frame token and information indicating timing of the at least one second operation, wherein the processor is configured to modify a state of the software application based on the at least one first metric message and the at least one second metric message, and wherein the processor is configured to roll back the state of the software application in response to at least one input associated with the frame token.

11. The server of claim 10, wherein the frame comprises at least one of a video frame and an audio frame generated by the software application.

12. The server of claim 10, wherein the processor is configured to generate the frame token in response to a request for the frame token provided by the software application.

13. The server of claim 10, wherein the processor is configured to generate a frame token comprising an identification number of the frame.

14. The server of claim 10, wherein the network interface is configured to provide the at least one first metric message in response to at least one of dispatching the frame for encoding, completing encoding of the frame, and transmitting the frame from the server for receipt by the client.

15. The server of claim 10, wherein the network interface is configured to provide the at least one second metric message in response to at least one of receiving the encoded information at the client, successfully decoding the encoded information, and presenting the frame to a player.

16. The server of claim 15, wherein the processor is configured to provide, to the software application, at least one third metric message comprising information representing the frame token for the frame and at least one input provided by the player concurrently with presenting the frame to the player via a display.

17. The server of claim 16, wherein the processor is configured to correlate the at least one input with the frame based on the at least one third metric message.

18. The server of claim 10, wherein the processor is configured to compensate for end-to-end latency based on the at least one first metric message and the at least one second metric message and modify the state of the software application based on the end-to-end latency.

19. A method comprising:
receiving, at a client from a server, encoded information representing a frame that is rendered for an application and an associated frame token;
decoding, at the client, the encoded information;
in response to decoding the encoded information, providing the frame to a display for presentation to a player;
transmitting, from the client for receipt by the server, at least one first metric message in response to the decoding and providing the frame to the display, the at least one first metric message comprising information representative of the frame token and information indicating timing of the decoding and providing the frame to the display; and
rolling back a state of the application in response to at least one input associated with the frame token.

20. The method of claim 19, wherein the frame comprises at least one of a video frame and an audio frame generated by the application.

21. The method of claim 19, wherein the frame token comprises an identification number of the frame.

22. The method of claim 19, further comprising:
detecting at least one input provided by the player concurrently with the frame being presented to the player via the display; and
transmitting, to the server, at least one second metric message comprising information representing the frame token for the frame and the at least one input.

23. An apparatus comprising:
a receiver configured to receive, from a server, encoded information representing a frame that is rendered for an application and an associated frame token;
a processor configured to decode the encoded information and in response to decoding the encoded information, provide the frame to a display for presentation to a player; and
a network interface configured to transmit, towards the server, at least one first metric message in response to the processor decoding and providing the frame to the display, the at least one first metric message comprising the frame token and information indicating timing of the decoding and providing the frame to the display,
wherein the processor is configured to roll back a state of the application in response to at least one input associated with the frame token.

24. The apparatus of claim 23, wherein the frame comprises at least one of a video frame and an audio frame generated by the application.

25. The apparatus of claim 23, wherein the frame token comprises an identification number of the frame.

26. The apparatus of claim 23, wherein:
the processor is configured to detect at least one input provided by the player concurrently with the frame being presented to the player via the display; and
the network interface is configured to transmit, to the server, at least one second metric message comprising information representing the frame token for the frame and the at least one input.

* * * * *